US007017011B2

(12) United States Patent
Lesmanne et al.

(10) Patent No.: US 7,017,011 B2
(45) Date of Patent: Mar. 21, 2006

(54) COHERENCE CONTROLLER FOR A MULTIPROCESSOR SYSTEM, MODULE, AND MULTIPROCESSOR SYSTEM WITH A MULTIMODULE ARCHITECTURE INCORPORATING SUCH A CONTROLLER

(75) Inventors: Sylvie Lesmanne, Les Clayes sous Bois (FR); Christian Bernard, Le Mesnil Saint-Denis (FR); Pamphile Koumou, Villepreux (FR)

(73) Assignee: Bull S.A., Louveciennes (FR)

( * ) Notice: Subject to any disclaimer, the term of this patent is extended or adjusted under 35 U.S.C. 154(b) by 215 days.

(21) Appl. No.: 10/075,289

(22) Filed: Feb. 15, 2002

(65) Prior Publication Data

US 2002/0112132 A1 Aug. 15, 2002

(30) Foreign Application Priority Data

Feb. 15, 2001 (FR) .................................. 01 02089

(51) Int. Cl.
*G06F 12/00* (2006.01)

(52) U.S. Cl. ........................ 711/141; 711/147; 711/148

(58) Field of Classification Search ................ 711/141, 711/144, 121, 240, 206, 148, 147; 700/5
See application file for complete search history.

(56) References Cited

U.S. PATENT DOCUMENTS 5,710,907 A * 1/1998 Hagersten et al. .......... 711/148
5,892,970 A * 4/1999 Hagersten ...................... 710/5
5,897,664 A * 4/1999 Nesheim et al. ............ 711/206
5,900,015 A 5/1999 Herger et al.
6,055,610 A * 4/2000 Smith et al. ................ 711/156
6,085,295 A 7/2000 Ekanadham et al.
6,088,769 A * 7/2000 Luick et al. ............... 711/141
6,148,378 A 11/2000 Bordaz et al.
6,295,598 B1 * 9/2001 Bertoni et al. ................ 712/28
6,338,123 B1 * 1/2002 Joseph et al. ............... 711/144
6,374,331 B1 * 4/2002 Janakiraman et al. ....... 711/141
6,560,681 B1 * 5/2003 Wilson et al. .............. 711/144
6,615,322 B1 * 9/2003 Arimilli et al. ............. 711/145
6,792,512 B1 * 9/2004 Nanda et al. ............... 711/144
6,901,485 B1 * 5/2005 Arimilli et al. ............. 711/135
2001/0010068 A1 * 7/2001 Michael et al. ............. 711/119
2001/0013089 A1 * 8/2001 Weber ........................ 711/146

FOREIGN PATENT DOCUMENTS

EP 0 881 579 A1 12/1998

* cited by examiner

*Primary Examiner*—Kevin Verbrugge
(74) *Attorney, Agent, or Firm*—Miles & Stockbridge P.C.; Edward J. Kondracki

(57) ABSTRACT

A coherence controller is included in a module which includes a plurality of multiprocessor units, each of which contains a main memory and processors equipped with respective cache memories. The module may be one of a plurality of similarly constructed modules connected by a router or other type of switching device. The coherence controller in each module includes a cache filter directory having a first filter directory for guaranteeing coherence between the local main memory and the cache memory in each of the processors of the module, and an external port connected to at least one of the other modules. The cache filter directory also includes a complementary filter directory, which tracks locations of lines or blocks of the local main memory copied from the module into other modules, and for guaranteeing coherence between the local main memory and the cache in each of the processors of the module and the other modules.

12 Claims, 2 Drawing Sheets

COHERENCE CONTROLLER FOR A MULTIPROCESSOR SYSTEM, MODULE, AND MULTIPROCESSOR SYSTEM WITH A MULTIMODULE ARCHITECTURE INCORPORATING SUCH A CONTROLLER

BACKGROUND OF THE INVENTION

1. Field of the Invention

The present invention concerns the creation of large-scale symmetric multiprocessor systems by assembling smaller basic multiprocessors, each generally comprising from one to four elementary microprocessors ($\mu$P), each associated with a cache memory, a main memory (MEM) and an input/output circuit (I/O) suitably linked to one another through an appropriate bus network. The multiprocessor system being managed by a common operating system OS. In particular, the invention concerns coherence controllers integrated into the multiprocessor systems and designed to guarantee the memory coherence of the latter, particularly between main and cache memories, it being specified that a memory access procedure is considered to be "coherent" if the value returned to a read instruction is always the value written by the last store instruction. In practice, incoherencies in cache memories are encountered in input/output procedures and also in situations where immediate writing into the memory of a multiprocessor is authorized without waiting and verifying that all the caches capable of having a copy of the memory have been modified.

2. Description of the Related Art

There are known multiprocessors produced in accordance with the schematic diagram illustrated in FIG. 1, and given as a nonlimiting example, primarily constituted by four basic multiprocessors 10–13, MP0, MP1, MP2 and MP3, with two microprocessors 40 and 40', respectively linked to a coherence controller 14 SW (Switch) by two-point high-speed links 20–23 controlled by four local port control units 30–33 PU0, PU1, PU2 and PU3. The controller 14 knows the distribution of the memory and the copies of memory lines or blocks among the main memory MEM 44 and the cache memories 42, 42' of the processors and includes, in addition to one or more routing tables and a collision window table (not represented), a cache filter directory 34 SF (also called a Snoop Filter) that keeps track of the copies of memory portions (lines or blocks) present in the caches of the multiprocessors. Hereinafter, and by convention, the terms "lines" or "blocks" will be used interchangeably to designate either term, unless otherwise indicated. Furthermore, the term "memory" used alone concerns the main memory or memories associated with the multiprocessors.

The cache filter directory 34, controlled by the control unit ILU 15, is capable of transmitting coherent access requests to a memory block (for purposes of a subsequent operation such as a Read, Write, Erase, etc.) or to the main memory in question, or to the microprocessor(s) having a copy of the desired block in their caches, after verifying the memory status of the block in question in order to maintain the memory coherence of the system. To do this, the cache filter directory 34 includes the address 35 of each block listed associated with a 4-bit presence vector 36 (where 4 represents the number "n" of basic multiprocessors 10–13) and with an Exclusive memory status bit Ex 37.

In practice, the bit MP0 of the presence vector 36 is set to 1 when the corresponding basic multiprocessor MP0 (the multiprocessor 10) actually includes in one of its cache memories a copy of a line or a block of the memory 44.

The Exclusive status bit Ex 37 belongs to the coherence protocol known as the MESI protocol, which generally describes the following four memory states:

Modified: in which the block (or line) in the cache has been modified with respect to the content of the memory (the data in the cache is valid but the corresponding storage position is invalid.

Exclusive: in which the block in the cache contains the only identical copy of the data of the memory at the same addresses.

Shared: in which the block in the cache contains data identical to that of the memory at the same addresses (at least one other cache can have the same data).

Invalid: in which the data in the block are invalid and cannot be used.

In practice, for the multiprocessors illustrated in FIG. 1 and FIG. 2, a partial MESI protocol is used, in which the "Modified" and "Exclusive" states are not distinguished:

- if only one bit MPi=1 and if the bit Ex=1, then the memory status of the block (or the line) is Modified or Exclusive;
- if one or more bits MPi=1 and if the bit Ex=0, then the memory state of the block is Shared;
- if all the bits MPi=0, then the memory state is Invalid.

The cache filter directory 34 integrates a search and monitoring protocol equipped with a so-called "snooping" logic. Thus, during a memory access request by a processor, the cache filter directory 34 performs a test of the cache memories it handles. During this verification, the traffic passes through ports 24–27 of the two-point high-speed links 20–23 without interfering with the accesses between the processor 40 and its cache memory 42. The cache filter directory is therefore capable of handling all coherent memory access requests.

The known multiprocessor architecture briefly described above is not, however, adapted to applications of large-scale symmetric multiprocessor servers comprising more than 16 processors.

In essence, the number of basic multiprocessors that can be connected to a coherence controller (in practice embodied by an integrated circuit of the ASIC type) is limited in practice by:

- the number of input/outputs of the controller, which according to current manufacturing techniques accepts only a limited number of two-point links (keeping in mind that these two-point links are necessary, because of their high-speed capacity, in order to avoid latency or delay problems during the processing of memory access requests).
- the size of the coherence controller that contains the cache filter directory (the size of the cache filter directory must be larger than the sum of the sizes of the directories of the caches integrated into the basic multiprocessors).
- the bandwidth for access to the cache filter directory, or maximum speed in Mbps, obtained in practice by two-point links constitutes a bottleneck for a large-scale multiprocessor server, since the cache filter directory must be consulted for all the coherent accesses of the basic multiprocessors.

SUMMARY OF THE INVENTION

The object of the present invention is to offer a coherence controller specifically capable of eliminating the drawbacks presented above or substantially attenuating their effects. Another object of the invention is to offer large-scale multiprocessor systems with multimodule architectures, particularly symmetric multiprocessor servers, with improved performance.

To this end, the invention proposes a coherence controller adapted for being connected to a plurality of processors equipped with a cache memory and with at least one local main memory in order to define a local module of basic multiprocessors, said coherence controller including a cache filter directory comprising a first filter directory SF designed to guarantee coherence between the local main memory and the cache memories of the local module, characterized in that it also includes an external port adapted for being connected to at least one external multiprocessor module identical to or compatible with said local module, the cache filter directory including a complementary filter directory ED for keeping track of the coordinates, particularly the addresses, of the lines or blocks of the local main memory copied from the local module into an external module and guaranteeing coherence between the local main memory and the cache memories of the local module and the external modules.

Thus, the extension ED of the cache filter directory is handled like the cache filter directory SF, and makes it possible to know if there are existing copies of the memory of the local module outside this module, and to propagate requests of local origin to the other modules or external modules only judiciously.

This solution is most effective in the current operating systems, which are beginning to managing affinities between current processes and the memory that they use (with automatic pooling between the memories and multiprocessors in question). In this case, the size of the directory ED required may be smaller than that of the directory SF, and the bandwidth of the intermodule link may be less than double that of an intramodule link.

According to a preferred embodiment of the coherence controller according to the invention, the coherence controller includes an “n”-bit presence vector, where n is the number of basic multiprocessors in a module (local presence vector), an “N-1”-bit extension of the presence vector, where N-1 is the total number of external modules connected to the external link (remote presence extension), and an Exclusive status bit. Thus, only the lines or blocks of the local memory can have a non-null presence vector in the cache filter directory ED.

This characteristic is also very advantageous because it makes it possible, without any particular problem, to manage the intermodule links and the intramodule links in approximately the same way, the coherence controller management protocol being extended to accommodate the notion of a local memory or a remote memory in the external modules.

Advantageously, the coherence controller includes n local port control units PU connected to the n basic multiprocessors of the local module, a control unit XPU of the external port and a common control unit ILU of the filter directories SF and ED. Likewise, the control unit XPU of the external port and the control units PU of the local ports are compatible with one another and use similar protocols that are largely common.

The invention also concerns a multiprocessor module comprising a plurality of processors equipped with a cache memory and at least one main memory, connected to a coherence controller as defined above in its various versions.

The invention also concerns a multiprocessor system with a multimodule architecture comprising at least two multiprocessor modules according to the invention as defined above, connected to one another directly or indirectly by the external links of the cache filter directories of their coherence controllers.

Advantageously, the external links of the multiprocessor system with a multimodule architecture are connected to one another through a switching device or router. Also quite advantageously, the switching device or router includes means for managing and/or filtering the data and/or requests in transit.

The invention also concerns a large-scale symmetric multiprocessor server with a multimodule architecture comprising “N” multiprocessor modules that are identical or compatible with one another, each module comprising a plurality of “n” basic multiprocessors equipped with at least one cache memory and at least one local main memory and connected to a local coherence controller including a local cache filter directory SF designed to guarantee local coherence between the local main memory and the cache memories of the module, hereinafter called the local module, each local coherence controller being connected by an external two-point link, possibly via a switching device or router, to at least one multiprocessor module outside said local module, the coherence controller including a complementary cache filter directory ED for keeping track of the coordinates, particularly the addresses, of the memory lines or blocks copied from the local module to an external module and guaranteeing coherence between the local main memory and the cache memories of the local module and the external modules.

According to a preferred embodiment of the multiprocessor server with a multimodule architecture according to the invention, each coherence controller includes an “n”-bit presence vector designed to indicate the presence or absence of a copy of a memory block or line in the cache memories of the local basic multiprocessors (local presence vector), an “N-1”-bit extension of the presence vector designed to indicate the presence or absence of a copy of a memory block or line in the cache memories of the multiprocessors of the external modules (remote presence extension), and an Exclusive status bit Ex.

Advantageously, the switching device or router includes means for managing and/or filtering the data and/or requests in transit.

BRIEF DESCRIPTION OF THE DRAWINGS

Other objects, advantages and characteristics of the invention will emerge through the reading of the following description of an exemplary embodiment of a coherence controller and of a multiprocessor server with a multimodule architecture according to the invention, given as a nonlimiting example in reference to the attached drawings in which.

DESCRIPTION OF THE PREFERRED EMBODIMENTS

Figure 2:
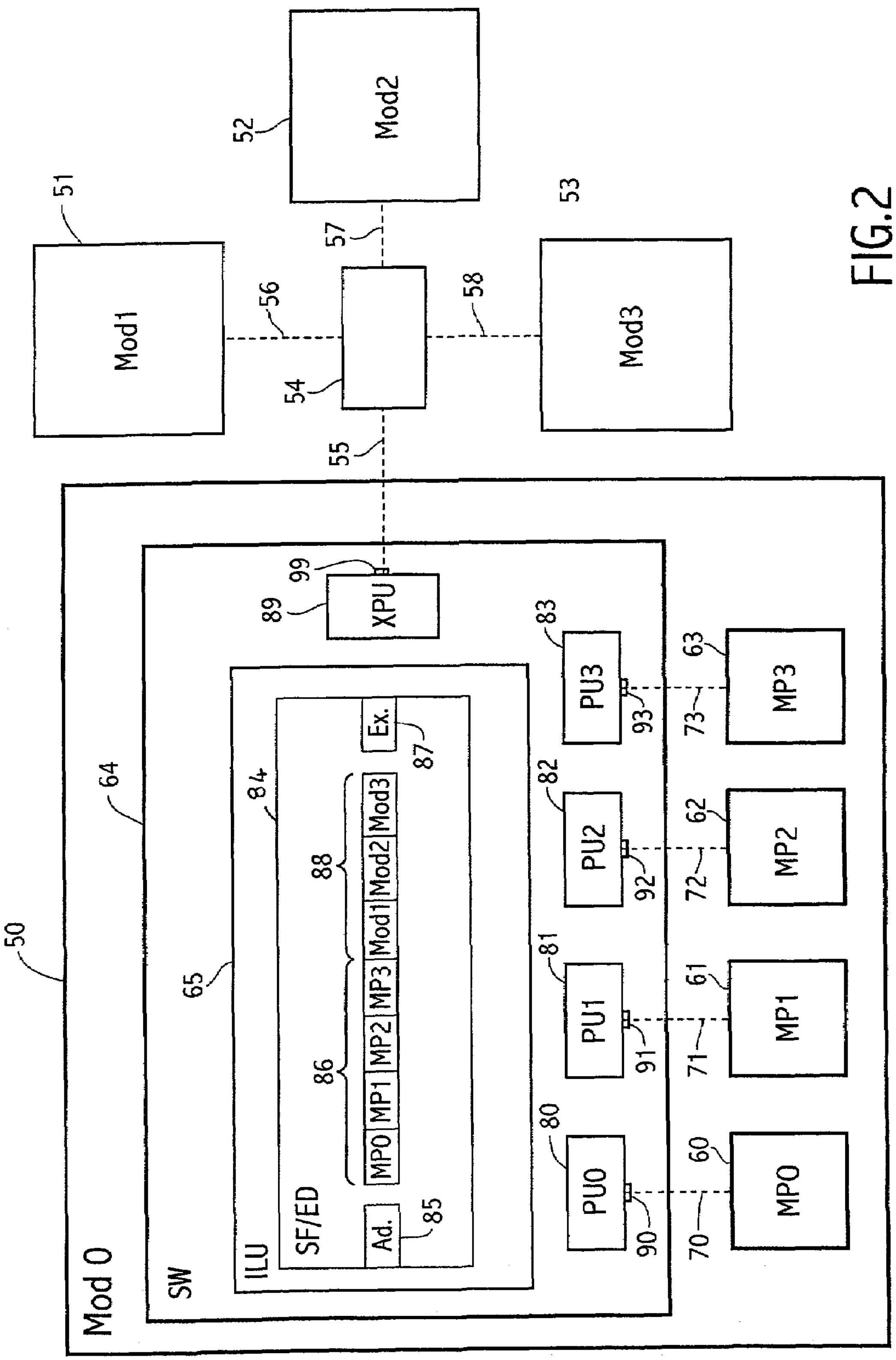
FIG. 2 shows a schematic representation of a multiprocessor server with a multimodule architecture according to the invention with a coherence controller having an extended function according to the invention.

The multiprocessor system or server with a multimodule architecture illustrated schematically in FIG. 2 is chiefly constituted by four (N=4) modules 50–53 (Mod 0 through Mod 3) that are identical or compatible with one another and appropriately connected to one another through a switching device or router 54 by two-point high-speed links, respectively 55 through 58. For simplicity's sake, only Mod 0 50 is illustrated in detail in FIG. 2.

By way of a nonlimiting example and in order to simplify the description, each module 50–53 is constituted by n=4 sets of basic multiprocessors 60–63 MP0–MP3, respectively linked to a coherence controller 64 SW (Switch) by two-point high-speed links 70–73 controlled by four control units PU0, PU1, PU2, PU3 80–83 of local ports 90–93. Again by way of a nonlimiting example, each basic multiprocessor MP0–MP3 60–63 is identical to the multiprocessor 10 already described in reference to FIG. 1 and includes two processors 40, 40' with their cache memories 42, 42', at least one common main memory, and an input/output unit, connected through a common bus network. Generally, the structure and the operating mode of the modules 50–53 are similar to the multiprocessor server of FIG. 1, and will not be re-described in detail, at least as far as the common points of the two multiprocessor servers are concerned. In particular, the multiprocessor server with a multimodule architecture of the invention is also controlled by an operating system of the OS type, common to all the modules.

Figure 1:
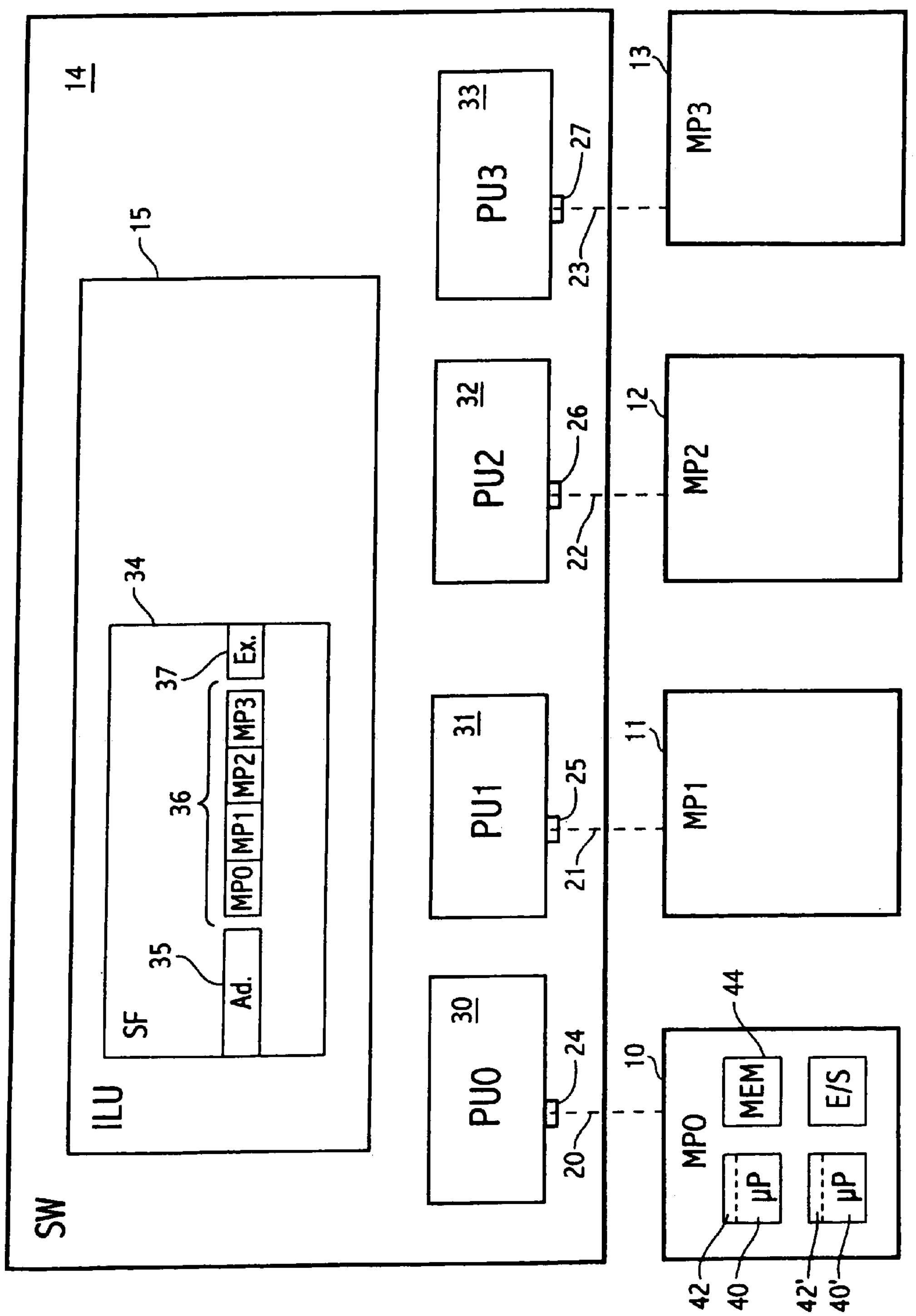
FIG. 1 shows a schematic representation of a multiprocessor server according to a known prior art and presented in the preamble of the present specification.

In order to guarantee the local coherence of the memory accesses at the level of each module, the coherence controller 64 of each module (for example the module 50) includes an extended cache filter directory SF/ED 84 to which a dual function is assigned:

the classic "Snoop Filter" function (SF), implemented locally in the module incorporating the coherence controller in question, which keeps track of the copies of memory portions (lines or blocks) present in the caches of the eight processors present in the same module (in this case the module 50) and presented above in reference to FIG. 1;

the extended external directory function (ED), which keeps track of the local memory lines or blocks (i.e., belonging to the module 50) exported to the other modules 51, 52 and 53.

To do this, the cache filter directory 84, controlled by the control unit 65, includes the address 85 of each block listed associated with a 4-bit local presence vector 86 (where 4 represents the number "n" of basic multiprocessors 60–63) and with an Exclusive memory status bit Ex 87, the characteristics and function of which have already been presented in reference to the server of FIG. 1. In practice, the bit MP0 of the presence vector 86 is set to 1 when the corresponding basic multiprocessor MP0 (the multiprocessor 60) actually includes in one of its cache memories a copy of a line or a block of the main memory integrated into this multiprocessor MP0. Furthermore, a 3-bit remote presence extension 88 of the presence vector is provided (where 3 represents the number N-1, with N=4 equal to the number of modules of the multiprocessor server), the bit Mod1 of the extension 88 being set to 1 when the module 51 (the module Mod 1) actually includes in one of its cache memories a copy of a memory line or block belonging to the module 50 Mod 0. In practice, the cache filter directory 84 SF/ED is created by the merging of the filter directories SF and ED, it being noted that only the lines of the local memory can have a non-null presence vector extension in the directory ED.

To conclude, the coherence controller 64 includes a control unit XPU 89 that controls the external port 99, suitably linked to the two-point link 55 connected to the router 54. In practice, the units PU0–PU3, 60–63 and XPU 89 use very similar protocols, particularly communication protocols, and have approximately the same behavior:

For any coherent access request coming from a local or external port, the unit (X)PU in question transmits the request to the ILU 65, which:

sends back to the sending (X)PU the status of the cache filter directory, transmits the request to the units having a copy, if necessary, opens a collision window in the ILU, if necessary (in order to perform an exhaustive serial processing of the requests in case of a collision of requests associated with the same storage address).

For any request sent by the ILU, the unit (X)PU in question transmits the request to the associated port and transmits to the destination all of the responses received from the port.

The units (X)PU handle the responses awaited for a coherent request, and once the responses have arrived, these units (X)PU close the collision window and request the updating of the cache filter directory with the correct presence and status bits. A module that sends request to the outside always receives a response for closing its collision window and updating its directory SF/ED.

Furthermore, a "miss" in the search for a local address in the directory SF/ED results in a routing to the local port unit PU of the "home" module of the address searched. Likewise, a "miss" in the search for a remote address in the directory SF/ED results in a routing to the external port unit XPU.

It will be noted that the main collision window is implemented in the "home" module, with an auxiliary collision window implemented in the sending module so that a module sends only one request to the same address (including retries) and an auxiliary collision window implemented in the target module so that the directory SF/ED receives only one request at the same address.

Among the differences encountered between the units PU and XPU, it will also be noted that the requests/responses sent through the external port are accompanied by a mask conveying complementary information designating the destination module or modules among the N-1 other modules. Lastly, in a remote line, a "miss" in SF/ED if sent by PU is transmitted through the external port, and if sent by XPU will receive in response the message "no local copy."

Thus, the coherence controller according to the invention having an external port and a cache filter directory with an extended presence vector and its implementation in a multiprocessor system with a multimodule architecture allows a substantial increase in the size of the cache filter directories and in the bandwidth as compared to a simple extrapolation of the multiprocessor of the prior art presented above.

The invention is not limited to a multiprocessor system with a multimodule architecture with 32 processors, described herein as a nonlimiting example, but also relates to multiprocessor systems or servers with 64 or more processors. Likewise, without going beyond the scope of the invention, the router 54 described as a basic switching device includes means for managing and/or filtering the data and/or requests in transit.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A local module and a plurality of remote modules, each of the local module and plurality of remote modules including a coherence controller capable of being connected to a plurality of multiprocessors within the same module, each of the multiprocessors including a local main memory and a plurality of processors each equipped with a cache memory, each coherence controller comprising:

a cache filter directory including a first filter directory for guaranteeing coherence between the local main memory and the cache memories within each respective multiprocessor;

the cache filter directory further including a complementary filter directory for tracking locations of lines or blocks of the local main memory of the local module copied from the local module into at least one remote module and for guaranteeing coherence between the local main memory and the cache memory of the local module and said at least one remote module; and an external port connected to said at least one remote module.

2. A coherence controller according to claim 1, wherein each respective cache filter directory includes:

an "n"-bit presence vector where n is a number of multiprocessors in the module, an "N-1"-bit extension of the presence vector, where N-1 is a total number of remote modules connected to the external port, and an Exclusive status bit.

3. A coherence controller according to claim 2, wherein the external port is connected directly or indirectly to said at least one remote module via an external two-point link.

4. A coherence controller according to claim 2, further comprising: "n" control units connected to the n multiprocessors in the local module, a control unit XPU connected to the external port, and a common control unit containing the cache filter directory.

5. A coherence controller according to claim 4, wherein the control unit XPU and the "n" control units are compatible with one another and use at least substantially similar protocols.

6. A multiprocessor module connected to a coherence controller as recited in claim 1.

7. A multiprocessor system with a multimodule architecture, comprising:

at least two multiprocessor modules as recited in claim 6, connected to one another directly or indirectly through external ports of coherence controllers located within said at least two multiprocessor modules.

8. A multiprocessor system according to claim 7, wherein said external ports are connected to one another through a switching device or router.

9. A multiprocessor system according to claim 8, wherein the switching device or router includes a unit which manages and/or filters data and/or requests in transit between said at least two multiprocessor modules.

10. A large-scale symmetric multiprocessor server with a multimodule architecture, comprising:

a plurality of multiprocessor modules including a local multiprocessor module and a remote multiprocessor module, each of said multiprocessor modules including:

a plurality of multiprocessors each equipped with at least one cache memory and at least one local main memory, and a local coherence controller connected to said multiprocessors within the same module and including a local cache filter directory for guaranteeing local coherence between the local main memory and the cache memories within the same module, said local coherence controller connected to at least said remote multiprocessor module, wherein the local coherence controller further includes:

a complementary cache filter directory for tracking a location of memory lines or blocks copied from said local multiprocessor module to said remote multiprocessor module and for guaranteeing coherence between the local main memory and the cache memories of the local processor module and said remote multiprocessor module.

11. A multiprocessor server with a multimodule architecture according to claim 10, wherein the coherence controller includes:

an "n"-bit presence vector which indicates presence or absence of a copy of a memory block or line in the cache memories of the multiprocessors, an "N-1"-bit extension of the presence vector which indicates presence or absence of a copy of a memory block or line in cache memories of multiprocessors in said remote multiprocessor module, and an Exclusive status bit.

12. A multiprocessor server with a multimodule architecture according to claim 10, further comprising:

a switching device or router which connects the first multiprocessor module with said remote multiprocessor module, said switching device or router including a unit which manages and/or filters data and/or requests in transit between the first multiprocessor module and the said remote multiprocessor module.

* * * * *